United States Patent
Freen

Patent Number: 5,555,867
Date of Patent: Sep. 17, 1996

[54] SWIRL FLOW PRECOMBUSTION CHAMBER

[75] Inventor: Paul D. Freen, Springfield, Ohio

[73] Assignee: Cooper Cameron Corporation, Houston, Tex.

[21] Appl. No.: 312,919

[22] Filed: Sep. 30, 1994

[51] Int. Cl.$^6$ ..................................... F02B 19/08
[52] U.S. Cl. .................... 123/260; 123/263; 123/273; 123/293
[58] Field of Search ..................... 123/262, 263, 123/273, 274, 293, 255, 260, 275, 290

[56] References Cited

U.S. PATENT DOCUMENTS

| | | | |
|---|---|---|---|
| 1,464,906 | 8/1923 | Hentschke | 123/293 X |
| 2,058,827 | 10/1936 | Ricardo | 123/275 |
| 2,314,175 | 3/1943 | Summers | 123/263 X |
| 2,422,610 | 6/1947 | Bagnulo | 123/262 X |
| 2,587,339 | 2/1952 | Du Rostu | 123/275 X |
| 2,857,891 | 10/1958 | Hoffman et al. | 123/262 |
| 3,089,471 | 5/1963 | Espenschied | 123/273 X |
| 3,443,553 | 5/1969 | Yamada et al. | 123/273 X |
| 4,224,902 | 9/1980 | Binder et al. | 123/293 X |
| 4,267,806 | 5/1981 | Kanda et al. | 123/287 |
| 4,325,333 | 4/1982 | Kato et al. | 123/260 |
| 4,395,983 | 8/1983 | Hamai et al. | 123/263 |
| 4,398,513 | 8/1983 | Tanasawa et al. | 123/263 X |
| 4,414,940 | 11/1983 | Loyd | 123/299 |
| 4,489,686 | 12/1984 | Yagi et al. | 123/260 |
| 4,594,976 | 6/1986 | Gonzalez | 123/260 |
| 4,765,293 | 8/1988 | Gonzalez | 123/275 |
| 5,024,193 | 6/1991 | Graze, Jr. | 123/293 X |
| 5,081,969 | 1/1992 | Long, III | 123/274 |
| 5,090,378 | 2/1992 | Gonzalez | 123/275 |
| 5,119,780 | 6/1992 | Ariga | 123/300 |
| 5,201,907 | 4/1993 | Hitomi et al. | 123/48 D |
| 5,293,851 | 3/1994 | Schaub | 123/275 X |

FOREIGN PATENT DOCUMENTS

| | | | |
|---|---|---|---|
| 2537041 | 3/1977 | Germany . | |
| 54-108108 | 8/1979 | Japan | 123/263 |
| 57-51909 | 3/1982 | Japan | 123/263 |
| 57-186016 | 11/1982 | Japan | 123/263 |
| 729839 | 5/1955 | United Kingdom | 123/260 |

Primary Examiner—Tony M. Argenbright
Attorney, Agent, or Firm—Burns, Doane, Swecker & Mathis LLP

[57] ABSTRACT

A combustion system of an internal combustion engine includes a main combustion chamber and a swirl flow precombustion chamber connected by a communicating passage. The communicating passage is connected tangentially to the precombustion chamber so as to induce a consistent, repeatable swirling flow pattern of gasses in the precombustion chamber during the compression stroke of the engine cycle. The swirl pattern thoroughly mixes the air, unburned fuel and burned fuel in the precombustion chamber. An igniter such as a spark plug is disposed in the precombustion chamber in a region having a low gas velocity during swirling to allow a small flame kernel to grow every engine cycle and consistently ignite the swirling gas, thereby improving engine efficiency, toxic emissions spark plug life, and allowing the igniter to run at a cooler temperature.

18 Claims, 2 Drawing Sheets

SWIRL FLOW PRECOMBUSTION CHAMBER

BACKGROUND

1. Field of the Invention

The present invention relates to a precombustion chamber in an internal combustion engine, and more particularly to a precombustion chamber in an internal combustion engine which ignites pilot quantities of an air/fuel mixture in order to ignite larger amounts of an air/fuel mixture within the main combustion chamber.

2. Description of the Related Art

Internal combustion engines with large reciprocating cylinders are commonly used in the oil and gas industry as prime movers for pipelines. These engines are also used in general industry to generate electric power. As with most internal combustion engines, a spark plug is employed to ignite the air/fuel mixture periodically in the engine cycle. However, as the size of the combustion chamber formed by the piston cylinder increases in diameter, the effectiveness of spark plugs to induce combustion is diminished. This is due in part because the arc generated by the spark plug is very localized. The situation is exacerbated when the air/fuel ratio is made lean in an effort to reduce emissions and increase fuel efficiency. In a large combustion chamber, for example, it may take an undesirable period of time for the combustion process to propagate throughout the combustion chamber.

To solve such ignition problems in large combustion chambers, precombustion chambers have been developed which can be connected to the main combustion chamber by a suitable passage. Precombustion chambers in natural gas, spark ignited, stratified charge engines can be used to initiate combustion in the lean air/fuel ratio main chamber. In this type of combustion system, small amounts of fuel are injected into the precombustion chamber. A spark plug or other means of ignition is energized, forming a flame kernel which ignites the rich charge in the precombustion chamber. The hot, burning combustion products from the precombustion chamber flow through the orifice into the main combustion chamber thereby igniting an air/fuel mixture previously injected into the main combustion chamber. Usually, if the precombustion chamber combustion is satisfactory (i.e., on time and complete) the main chamber combustion will be satisfactory. As the burning air and fuel and combustion products from the precombustion chamber occupy a much larger volume than the spark plug arc, the combustion process within the main combustion chamber is completed much more rapidly, resulting in greater engine efficiency.

However, in prior art engines having precombustion chambers, combustion of the precombustion charge has not been successful because the air/fuel mixture is admitted into the precombustion chamber from the main combustion chamber as a high velocity stream. High velocity flows, although turbulent, fail to mix the burned fuel, unburned fuel, and air sufficiently to ensure consistent precombustion chamber combustion near the spark plug gap. Poor mixing of the burned fuel, unburned fuel and air can cause inconsistent combustion because there is not always a combustible mixture at the spark plug gap. Consequently, inconsistent precombustion chamber combustion causes the main chamber combustion to occur either too early, too late, too slowly, or not at all, resulting in lower engine efficiency and higher toxic exhaust emissions.

Inconsistencies in precombustion chamber combustion and in the hot gasses generated are particularly problematic when natural gas is used as the fuel with a lean air/fuel mixture, resulting in inconsistent main combustion chamber firing. The natural variability of the constituents in natural gas can introduce inconsistencies in burning, as different constituents burn hotter or colder in the engine. Further, a lean air/fuel ratio can increase the likelihood of inconsistencies in burning because there is a smaller margin of fuel in the combustion chamber in excess of that amount necessary for proper combustion. Particularly if the fuel is not mixed sufficiently, there can be regions of gas near the spark plug gap at the time of combustion that do not contain sufficient fuel for consistent burning.

A partial solution to some of the aforementioned problems is described in U.S. Pat. No. 4,594,976 to Gonzalez which discloses a hybrid internal combustion reciprocating engine including a prechamber connected to the main combustion chamber by means of a passage or orifice located in such a manner as to induce a swirling airflow within the prechamber during the compression stroke. The Gonzalez invention, however, suffers from a problem similar to other precombustion chamber engines in which high velocity gas is injected into the precombustion chamber. That is, the combustion process is disrupted when the spark plug gap is located in a high gas velocity region of the precombustion chamber. A high gas velocity at the spark plug gap inhibits rapid propagation of the combustion process throughout the precombustion chamber.

Typically, the combustion inside precombustion chambers is difficult to initiate and maintain consistently because the gas flow within the precombustion chamber is so fast and unorganized that the flame kernel (the small burning air and fuel mixture just after the spark plug first ignites it) is often forced against a cold wall in the chamber which either extinguishes this small flame kernel completely, resulting in a complete misfire, or causes a long delay before the kernel grows enough to light off the rest of the unburned precombustion chamber charge.

By contrast, good consistent ignition occurs when the mixture at the spark plug gap is low in velocity and at a stoichiometric air-fuel ratio, where complete burning of the fuel occurs. These conditions allow the flame kernel to grow to sufficient size and strength to ignite the rest of the unburned charge.

Prior art engines have also failed to include means for dispersing the ignited gas over a broad area in the main combustion chamber. Instead, the ignited gas from the precombustion chamber has been supplied to the main combustion chamber through a single small opening. Consequently, the period of propagation of the combustion process throughout the main combustion chamber has been unacceptably long in duration, especially in large main combustion chambers, resulting in inefficient and inconsistent firing.

There is, therefore, a need in the art for an internal combustion engine with a precombustion chamber which burns pilot fuel and air consistently, evenly and efficiently and which prevents overheating of the spark plug unit. Further, there is a need in the art for an engine with a precombustion chamber that provides a consistently well-mixed, low velocity air/fuel mixture at the spark plug gap, and which broadly distributes the ignited gas throughout the main combustion chamber.

SUMMARY

Accordingly, it is an object of the present invention to provide a combustion system including a main combustion chamber and a precombustion chamber which promotes stable and consistent combustion, thereby improving engine efficiency, reducing toxic exhaust emissions, and reducing fuel consumption.

According to an exemplary embodiment of the invention, a combustion system including a main combustion chamber and a precombustion chamber is provided in which the precombustion chamber organizes the gas flow from the main combustion chamber into a swirling motion (very similar to stirring a cup of coffee) to thoroughly mix the air, fuel and burned fuel into a homogeneous mixture. The organization of the flow into a swirling motion allows the gas velocity profile in the precombustion chamber to be consistent and predictable so that a repeatable flow pattern and a consistent air/fuel ratio can be provided inside the precombustion chamber for every engine cycle. Further, the predictable flow pattern allows the spark plug to be located in a region within the precombustion chamber having a consistently quiescent, low gas velocity. Placing the plug in a low velocity region allows a small flame kernel to grow every engine cycle to sufficient size to ignite the rest of the high velocity, swirling unburned charge, resulting in consistent dependable flame kernel inception and even burning within the precombustion chamber.

A further object of the invention is to provide a precombustion chamber which allows the spark plug to operate at cooler temperatures, thereby increasing the life of the spark plug unit and increasing the overall reliability of the engine.

It is a further object of the invention to provide a precombustion chamber assembly that is easily replaceable.

It is a further object of the invention to provide a nozzle for dispersing a volume of ignited gas from the precombustion chamber over a large volume of the main combustion chamber.

Advantages of the present invention include improved spark plug life, reduced fuel consumption and reduced toxic exhaust emissions.

BRIEF DESCRIPTION OF THE DRAWINGS

The foregoing, and other objects, features and advantages of the present invention will be more readily understood upon reading the following detailed description in conjunction with the drawings in which.

DETAILED DESCRIPTION

Figure 1:
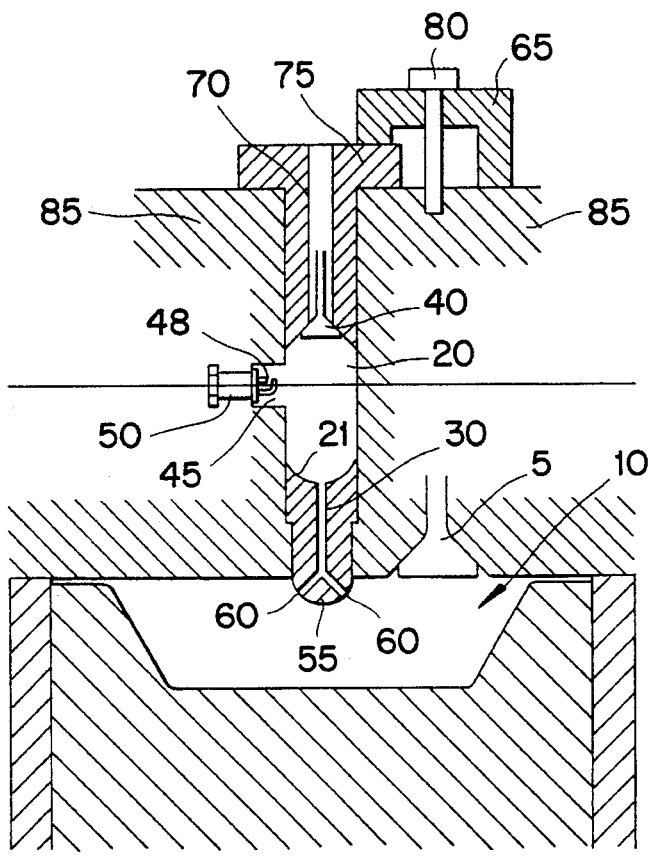
FIG. 1 shows a combustion system including a swirl flow precombustion chamber, a communicating passage, and a main combustion chamber.

FIG. 1 shows an exemplary embodiment of a combustion system according to the present invention including a main combustion chamber 10, a swirl flow precombustion chamber 20, and a communicating passage 30. During the intake stroke of an internal combustion engine cycle, a pre-mixed air/fuel mixture is drawn into the main combustion chamber 10 through at least one intake valve 5. Also during the intake stroke, fuel is admitted into the precombustion chamber 20 through a precombustion chamber valve 40. Subsequently, in the compression stroke, a portion of the air/fuel mixture as well as residual burned fuel from the previous engine cycle are directed from the main combustion chamber 10 to the precombustion chamber 20 through the connecting passage 30. The passage 30 enters the precombustion chamber 20 tangentially to induce swirling of the gasses in the precombustion chamber 20. The swirling gasses in the precombustion chamber 20 thoroughly mix the air, burned fuel, and unburned fuel from the main combustion chamber with the precombustion chamber fuel previously admitted through the precombustion chamber valve 40, and the mixture can then be ignited by igniter 50 at an appropriate time during the engine cycle. The ignited mixture then expands rapidly and is forced through the passage 30 into the main combustion chamber 10 where it ignites the air/fuel mixture in the main combustion chamber 10. The system allows even, consistent, and predictable ignition of an air/fuel mixture in the main combustion chamber 10.

Figure 2:
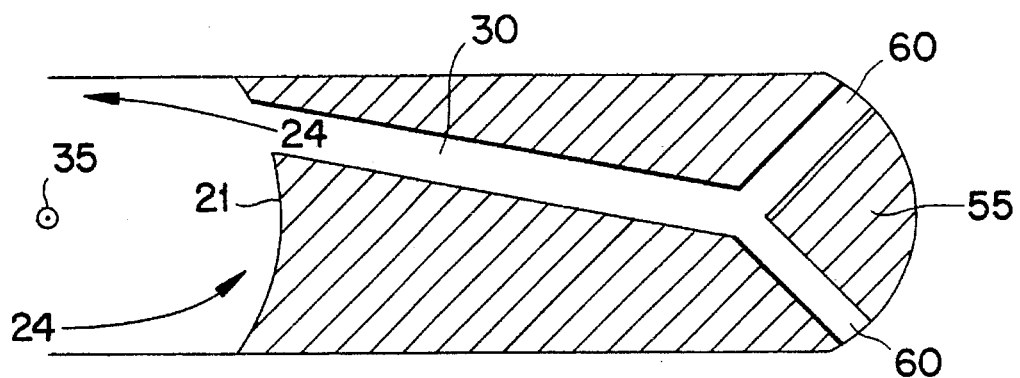
FIG. 2 shows the communicating passage of FIG. 1 including a nozzle.

FIG. 2 shows an exemplary embodiment of the communicating passage 30 disposed between the swirl flow precombustion chamber 20 and the main combustion chamber 10. The wall of the precombustion chamber 20 preferably is curved in at least one portion 21 thereof to encourage swirling of the mixture of fuel, air, and burned fuel from the main combustion chamber 10 as the mixture enters the precombustion chamber 20. The communicating passage 30 opens into the precombustion chamber 20 along the curved portion 21 of the wall of the precombustion chamber 20 to direct the mixture to flow into the precombustion chamber 20 tangentially as indicated by the flow lines 24. This arrangement of the passage 30 causes the flow pattern in the precombustion chamber 20 to swirl preferably about a horizontal axis 35 as shown in FIGS. 1 and 2. The organized swirling motion is preferably achieved by a passage 30 having a length/diameter ratio greater than 2.

As swirling is induced during the compression stroke of the engine cycle, a fuel such as natural gas, which has been introduced by the fuel valve 40 into the precombustion chamber 20 during the intake stroke, is mixed with the swirling gasses. The swirl flow precombustion chamber 20 thoroughly mixes the burned fuel, unburned fuel and air from the main combustion chamber with the precombustion chamber fuel into a homogeneous mixture which can be used to consistently and evenly ignite a lean air/fuel mixture in a large main combustion chamber 10, for example. This process overcomes the problem in prior engines of poor mixing of the burned fuel, unburned fuel and air, which has caused inconsistent combustion because there has not always been a combustible mixture at the spark plug gap during ignition.

The fuel valve 40, which introduces the fuel into the precombustion chamber during the intake stroke, can be a pressure-activated valve such as a check valve, which opens and closes according the pressure difference between the precombustion chamber and the fuel header. According to a preferred embodiment of the invention, the fuel valve 40 can be a mechanically-actuated valve, such as a poppet valve. The poppet valve may be actuated by an intake camshaft, for example. A mechanically-activated precombustion chamber valve 40 offers the advantage of reliability and can overcome leaking and sticking problems encountered in the prior art.

Figure 3:
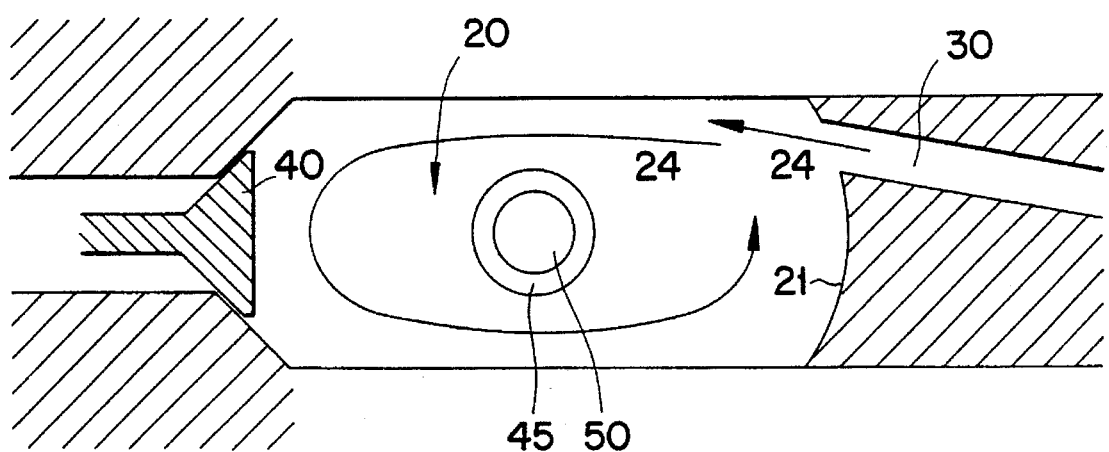
FIG. 3 shows a swirl flow precombustion chamber of FIG. 1.

FIG. 3 shows an exemplary embodiment of the precombustion chamber 20 including an igniter 50, such as a spark plug or a glow plug, disposed in the precombustion chamber 20 for igniting the swirling air/fuel mixture. Flow lines 24 indicate the direction of flow of the gasses in the precombustion chamber during swirling. The configuration of two combustion chambers and a communicating passage therebetween allows a consistent flow pattern to be established during every engine cycle. Further, because the flow pattern is consistent and repeatable, the precombustion chamber 20 is preferably designed with the spark plug 50 in a region having a low gas velocity.

Specifically, as the gasses enter the precombustion chamber 20 from the main combustion chamber 10 via the passage 30, a swirling effect is created in the precombustion chamber 20. As in any vortical flow pattern, the mixture is calmest, i.e., less turbulent at the center or axis of rotation 35 of the flow.

Taking advantage of this phenomenon, a recess 45 is created in a wall of the precombustion chamber 20 in alignment with the axis of rotation 35 of the vortical flow pattern. The spark plug 50 is located such that the spark plug gap 48 is within the recess 45 so that the spark plug gap 48 contacts the calmest section of the vortical flow.

A low velocity of the flow near the spark plug gap 48 is desirable for developing a good flame kernel and allows for consistent and rapid ignition of the air/fuel mixture because the combustion process is able to propagate much more rapidly throughout the precombustion chamber when the gas surrounding the spark plug has a low velocity.

A low velocity of the flow near the spark plug gap during ignition also allows the spark plug to operate at cooler temperatures because the spark plug is not immersed in hot gasses during and after ignition, as would be the case in a high-velocity region.

Locating the spark plug 50 in a low velocity region also overcomes a problem in prior art engines in which the flame kernel is forced against a cold wall in the precombustion chamber. The present invention eliminates this problem by positioning the spark plug 50 such that the flow lines do not extend from the spark plug 50 directly to the precombustion chamber wall.

Good consistent ignition is also promoted when the air/fuel ratio at the spark plug gap 48 is such that all the air and fuel are converted to combustion products. This is known as the stoichiometric air-fuel ratio. These conditions allow the flame kernel to grow to sufficient size and strength to ignite all of the unburned charge within the precombustion chamber.

Figure 4:
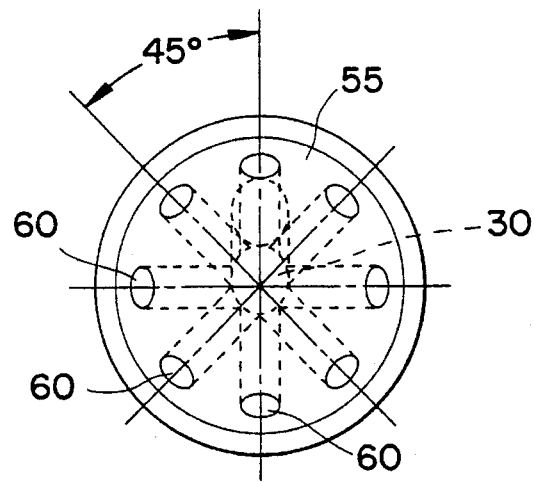
FIG. 4 shows an end view of a nozzle of the communicating passage of FIG. 2.

As the air/fuel mixture in the precombustion chamber 20 is ignited, the pressure in the precombustion chamber 20 increases, directing the ignited mixture out of the precombustion chamber 20, through the communicating passage 30 and into the main combustion chamber 10 to ignite the air/fuel mixture in the main combustion chamber 10. As shown in FIGS. 2 and 4, the communicating passage 30 can include a nozzle 55 including a plurality of nozzle openings 60 to direct ignited gas in different directions and into different regions of the main combustion chamber 10 and to disperse ignited gas into the main combustion chamber 10 over a broad area. Dispersion of the ignited gas by the nozzle facilitates ignition of the mixture and allows the air/fuel mixture in the main combustion chamber 10 to be ignited more rapidly than would a single nozzle opening. Thus, the ignited charge from the precombustion chamber can ignite the air/fuel mixture in the entire main combustion chamber consistently, evenly and repeatedly, even when natural gas is used in a relatively large main combustion chamber 10.

According to a further embodiment of the invention, the precombustion chamber 20 and the nozzle unit 55 can be included in a precombustion chamber assembly 70, as shown in FIG. 1, which is removably attached to the engine. The precombustion chamber assembly can be attached by any suitable means, for example a clamp. FIG. 1 shows a clamp 65 which can secure a flange 75 of the precombustion chamber assembly 70 to the cylinder head 85 with a bolt 80. The clamp 65 can be easily removed, allowing the precombustion chamber assembly 70, which includes the precombustion chamber 20 and the nozzle 55, to be easily replaced. Once the clamp 65 is removed, a slide hammer tool can be used to remove the precombustion chamber assembly 70 from the cylinder head 85.

Filed concurrently herewith are two U.S. patent applications by the same inventor, and which are entitled "Natural Gas Molecular Weight Sensor" and "Natural Gas Engine Control System". The subject matter of the present application may be used in conjunction with the subject matter of either or both of the concurrently filed applications. Accordingly, the subject matter of the two concurrently filed applications is incorporated herein by reference.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are to be considered within the scope and spirit of the present invention as defined by the following claims.

What is claimed is:

1. A combustion system comprising:

a main combustion chamber;

a precombustion chamber having a recess;

an igniter, disposed in the recess of the precombustion chamber, for igniting a combustible gas;

a communicating passage connecting the main combustion chamber to the precombustion chamber, said passage being located so as to induce gas swirling in a vortical pattern in the precombustion chamber; and the igniter is disposed in the precombustion chamber substantially on an axis of rotation of the vortical pattern.

2. The combustion system of claim 1, further comprising means for introducing gas into the main combustion chamber.

3. The combustion system of claim 1, wherein the igniter comprises a spark plug.

4. The combustion system of claim 1, wherein the igniter comprises a glow plug.

5. The combustion system of claim 1, wherein the communicating passage includes a nozzle for dispersing gas throughout the main combustion chamber.

6. The combustion system of claim 5, wherein the nozzle includes a least two openings into the main combustion chamber.

7. The combustion system of claim 6, wherein said two openings direct gas in different directions into the main combustion chamber.

8. The combustion system of claim 1, wherein the communication passage further comprises means for dispersing ignited gas into the main combustion chamber.

9. The combustion system of claim 5, wherein the precombustion chamber and the nozzle form a precombustion chamber assembly which is removably attached to the engine via a clamp.

10. The combustion system of claim 1, further comprising a mechanically-activated valve for introducing the combustible gas into the precombustion chamber.

11. The combustion system of claim 10, wherein the valve comprises a poppet valve.

12. A combustion system comprising:

a main combustion chamber;

a precombustion chamber;

a spark plug for igniting a combustible gas disposed in the precombustion chamber;

a communicating passage connecting the main combustion chamber to the precombustion chamber, wherein the passage is located so as to induce gas swirling in the precombustion chamber; and a nozzle having a plurality of nozzle openings which interconnect the communicating passage to the main combustion chamber so as to facilitate distribution of gasses throughout the main combustion chamber.

13. The combustion system of claim 12, wherein the precombustion chamber and the nozzle form a precombustion chamber assembly which is removably attached to the engine via a clamp.

14. A method for igniting gas in a combustion system of an internal combustion engine, said combustion system comprising a main combustion chamber connected to a swirl flow precombustion chamber, said method comprising the steps of:

directing gas into the precombustion chamber so as to introduce gas swirling in a vortical pattern in the precombustion chamber; and igniting the swirling gas in a recess of the precombustion chamber substantially along an axis of the vortical pattern.

15. The method of claim 14, further comprising the step of directing the ignited gas from the precombustion chamber to the main combustion chamber to thereby ignite gas in the main combustion chamber.

16. The method of claim 14, further comprising the step of introducing natural gas into the main combustion chamber.

17. The method of claim 14, further comprising the step of dispersing the ignited gas in the main combustion chamber over a broad region of the main combustion chamber.

18. The method of claim 14, further comprising the step of introducing gas into the precombustion chamber via a mechanically-activated valve.

* * * * *